Dec. 9, 1924.

H. F. CARDEN

LOCK WASHER

Filed Sept. 8, 1923

1,518,773

H. F. Carden, Inventor,

By C. A. Snow & Co.

Attorneys,

Patented Dec. 9, 1924.

1,518,773

UNITED STATES PATENT OFFICE.

HARRY F. CARDEN, OF LAWRENCEBURG, TENNESSEE.

LOCK WASHER.

Application filed September 8, 1923. Serial No. 661,626.

*To all whom it may concern;*

Be it known that I, HARRY F. CARDEN, a citizen of the United States, residing at Lawrenceburg, in the county of Lawrence and State of Tennessee, have invented a new and useful Lock Washer, of which the following is a specification.

This invention relates to a washer construction, and aims to provide a washer of a novel construction to provide a nut lock.

The primary object of the invention is to provide a washer having cutting ribs designed to cut portions from the nut associated therewith, which portions lie between the ribs of the washer to connect the washer and nut.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
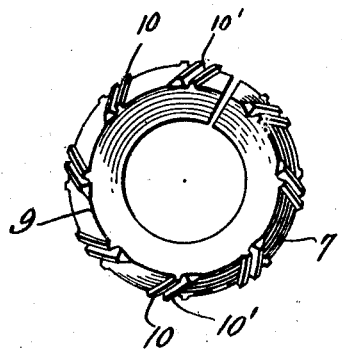
Figure 1 is a plan view of a washer constructed in accordance with the invention.
Figure 2:
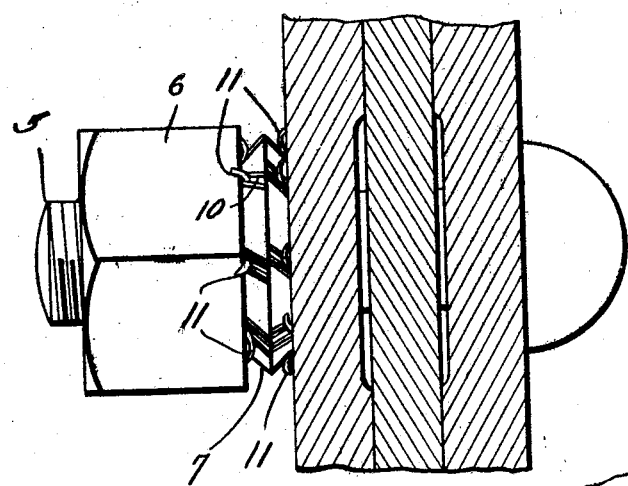
Figure 2 is a side elevational view thereof disclosing the same as positioned on a bolt.
Figure 3:
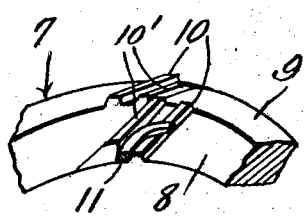
Figure 3 is an enlarged detail view disclosing the cutting ribs and portion of the metal cut by the ribs.
Figure 4:
Figure 4 is a view disclosing one of the tongues cut from the metal associated with the washer.

Referring to the drawing in detail, the reference character 5 designates a bolt on which the nut 6 is positioned. The washer forming the essence of the invention is indicated by the reference character 7 and is of the spring washer type, the same being slightly twisted to provide inclined surfaces 8 and 9. Formed integrally on the inclined surfaces 8 and 9 are cutting ribs 10 and 10′, which cutting ribs have their cutting edges oppositely disposed so that the nut associated with the washer will rotate over the cutting edges associated therewith, while the nut is being rotated in one direction. When the nut has been rotated to set up a binding action between the nut and washer, further movement of the nut will cause the washer to cut into the nut and the metal contacting with the opposite side of the washer to the end that locking tongues are cut from the metal, which locking tongues lie between the ribs 10 and 10′.

Associated with each cutting rib 10 is a locking rib 10′, which locking ribs are slightly cut away at one of the respective ends thereof to allow a clearance for the ends of the cutting rib associated therewith to perform its cutting action.

When the washer is put to use, it is obvious that as the nut rotates over the washer and the washer in turn rotates over the metal surface associated therewith, locking tongues 11 will be cut from the nut and metal surface, which locking tongues closely engage the locking ribs and hold the tongues between the cutting ribs and locking ribs to the end that the nut washer and metal surface associated with the nut, are locked together.

I claim:—

In a device of the character described, a spring washer including a body portion having inclined outer surfaces, pairs of ribs disposed on the inclined surfaces, one rib of each pair being cut away at one end thereof to provide a clearance to allow the opposite blade of the pair to cut into the metal surface disposed adjacent thereto, to cut locking tongues therefrom.

In testimony that I claim the foregoing as my own, I have hereto affixed my signature in the presence of two witnesses.

HARRY F. CARDEN.

Witnesses:
 NOBLE L. FREEMON,
 F. W. CARDEN.